United States Patent
Ekici et al.

(10) Patent No.: US 8,315,189 B2
(45) Date of Patent: Nov. 20, 2012

(54) SYSTEM AND METHOD FOR DETECTING A TARGET CELL IN A CELLULAR NETWORK

(75) Inventors: Ozgur Ekici, Ottawa (CA); M. Khaledul Islam, Kanata (CA)

(73) Assignee: Research In Motion Limited, Waterloo, ON ( * ) Notice: Subject to any disclaimer, the term of this patent is extended or adjusted under 35 U.S.C. 154(b) by 359 days.

(21) Appl. No.: 12/710,550

(22) Filed: Feb. 23, 2010

(65) Prior Publication Data

US 2011/0205932 A1  Aug. 25, 2011

(51) Int. Cl.
H04L 12/28  (2006.01)
H04Q 7/00  (2006.01)

(52) U.S. Cl. ..................... 370/255; 370/328

(58) Field of Classification Search .............. 370/254, 370/255, 328, 331, 338
See application file for complete search history.

(56) References Cited

U.S. PATENT DOCUMENTS

| | | | | |
|---|---|---|---|---|
| 6,061,337 | A * | 5/2000 | Light et al. | 370/331 |
| 6,631,263 | B1 * | 10/2003 | Corkery | 455/436 |
| 7,697,479 | B2 * | 4/2010 | Metke et al. | 370/331 |
| 2007/0165583 | A1 | 7/2007 | Pecen | |
| 2009/0005099 | A1 | 1/2009 | Jung et al. | |
| 2009/0092080 | A1 * | 4/2009 | Balasubramanian et al. | 370/328 |
| 2009/0098873 | A1 | 4/2009 | Gogic | |
| 2010/0173630 | A1 * | 7/2010 | Han et al. | 455/433 |

FOREIGN PATENT DOCUMENTS

| | | |
|---|---|---|
| WO | 96/13951 A1 | 5/1996 |
| WO | 9920064 A1 | 4/1999 |
| WO | 00/28768 A1 | 5/2000 |
| WO | 2008086648 A1 | 7/2008 |
| WO | 2008131591 A1 | 11/2008 |

OTHER PUBLICATIONS

PCT application No. PCT/CA2011/000195, International Search Report, dated May 17, 2011.
PCT application No. PCT/CA2011/000195, Written Opinion of the International Searching Authority , dated May 7, 2011.
Femto cells—beyond the type dated Aug. 13, 2007 <online: http://www.mostlycommonsense.com/?cat=3>.
Proposal for System Reference Architecture of Supporting Femto Cell Operations in IEEE 802.16m dated Nov. 11, 2007 <online: http://www.ieee802.org/16/tgm/contrib/C80216m-07_287r1.doc>.
EP application 10154436.9, Extended European Search report dated Jul. 28, 2010.

* cited by examiner

*Primary Examiner* — Hong Cho
(74) *Attorney, Agent, or Firm* — Moffat & Co.

(57) ABSTRACT

A method for detecting a target cell by a mobile device, the method comprising storing traversed paths of the mobile device, the stored traversed paths each comprising information to identify cells in a sequence of cells traversed by the mobile device referenced to the target cell, compiling information identifying cells traversed by the device in real time to produce current path information, comparing the current path information to the stored traversed paths and inferring from the comparison a relative proximity of the mobile device to the target cell and adapting a search for the target cell based on the relative proximity.

22 Claims, 8 Drawing Sheets

400

| Location: | Device current path list (tracked realtime): | Device making comparison to Track-1: |
|---|---|---|
| C | MC1 | |
| H | MC1→MC2 | MC3 → MC4 → MC5 → MC6 → MC7 |
| I | MC1→MC2→MC3 | MC3 → MC4 → MC5 → MC6 → MC7 |
| J | MC1→MC2→MC3→MC4 | MC3 ⇾ MC4 → MC5 → MC6 → MC7 |
| G | MC1→MC2→MC3→MC4→MC5 | MC3 ⇾ MC4 ⇾ MC5 → MC6 → MC7 |
| K | MC2→MC3→MC4→MC5→MC6 | MC3 ⇾ MC4 ⇾ MC5 ⇾ MC6 → MC7 |
| A | MC3→MC4→MC5→MC6→MC7 | MC3 ⇾ MC4 ⇾ MC5 ⇾ MC6 ⇾ MC7 |

SYSTEM AND METHOD FOR DETECTING A TARGET CELL IN A CELLULAR NETWORK

FIELD OF THE DISCLOSURE

The present disclosure relates to wireless networks, and in particular to a system and method for detecting target cells, such as home cells, in a cellular network.

BACKGROUND

Home cells, of which femto cells and Wi-Fi access points are examples, sometimes known as an access point base station are typically designed for use in residential or small business environments.

A femtocell is a low-power wireless access point that operates in licensed spectrum and connects mobile devices to a mobile network using a residential broadband Internet connection. Depending on the network operator and mobile device capability, a mobile device may use a variety of different radio access technologies (RAT)—for example one or more 3GPP2-defined cdma2000 1x/1xEV-DO and/or one or more of 3GPP-defined air interfaces such as GSM/GPRS/EDGE, WCDMA, TD-SCDMA, LTE etc. In 3GPP terminology, a home cell is referred to as Home Node B or enhanced Home Node B. A femtocell incorporates functionality of a typical base station—for example a UMTS femtocell may comprise a Node B, a Radio Network Controller (RNC), a Serving GPRS Support Node (SGSN) that uses subscriber's cable or DSL connection for backhaul connectivity. It allows service providers to extend or provide better network coverage indoors, especially where network coverage would otherwise be limited or unavailable to mobile devices. Femtocells are typically overlaid by one or more macro cells and serve a significantly smaller geographic area or subscriber constituency than a macro cell.

A Wi-Fi access point is another low-power wireless access technology that operates on un-licensed bands which is defined by IEEE 802.11 standards. In IEEE 802.11 standards, a home cell is referred as an access point. A mobile device that can operate in air interfaces defined by multiple standard bodies is typically called a multi-mode device—for example, a multi-mode device may be capable of supporting cdma2000 1x/1xEV-DO, EDGE/HSPA/LTE in addition to WiFi.

Typically home cells do not broadcast any indication identifying it as a home cell. For example, a UMTS femtocell that is not compliant with 3GPP release 8 or above will not have such indication. Even if a femtocell (such as a 3GPP release 8 compliant cell) that may provide such indication over a broadcast channel, a UMTS mobile device not compliant with release 8 will not be able to decode such indication. In other words, there is a variety of situations when a mobile device may not be able to distinguish between a typical macro cell and a femtocell including his/her own. Even if a femtocell explicitly identifies itself as a femto cell, the presence or proximity of this femto cell may not be broadcast in the macro cells due to limits on neighbour cell information that the macro cell can broadcast. Currently, an UMTS cell can have at most thirty two neighbour cells information on a given frequency, whereas a macro cell can have tens if not hundreds of femto cells overlapped in a coverage area. Considering this limitation, the mobile device would not have information regarding a target femto cell presence and therefore would not know when or where to initiate a scan for the targeted femtocell in an intelligent manner.

On the other hand, the preferred network/cell for a femtocell owner/subscriber is their own or subscribed femtocell(s) for a variety of reasons such as lower or better tariff on usage. Therefore a typical implementation of a mobile device that operates both in an operator's macro network and subscribed femtocells involves frequent searching for more preferred femtocell which in turn may lead to increased consumption of battery power and reduction in battery life. A similar scenario may exist if the home cell belongs to another RAT (radio access technology) that does not belong to the same core network, as for example where the cellular network that the mobile device is currently on is part of a UMTS network and the home cell is a WiFi network. There may not be co-ordination between multiple air-interfaces and underlying networks in terms of broadcasting presence of one another.

BRIEF DESCRIPTION OF THE DRAWINGS

The present disclosure will be better understood with reference to drawings in which:

FIG. 7 is a graphical representation of stored path detection; and

DETAILED DESCRIPTION

Figure 1:
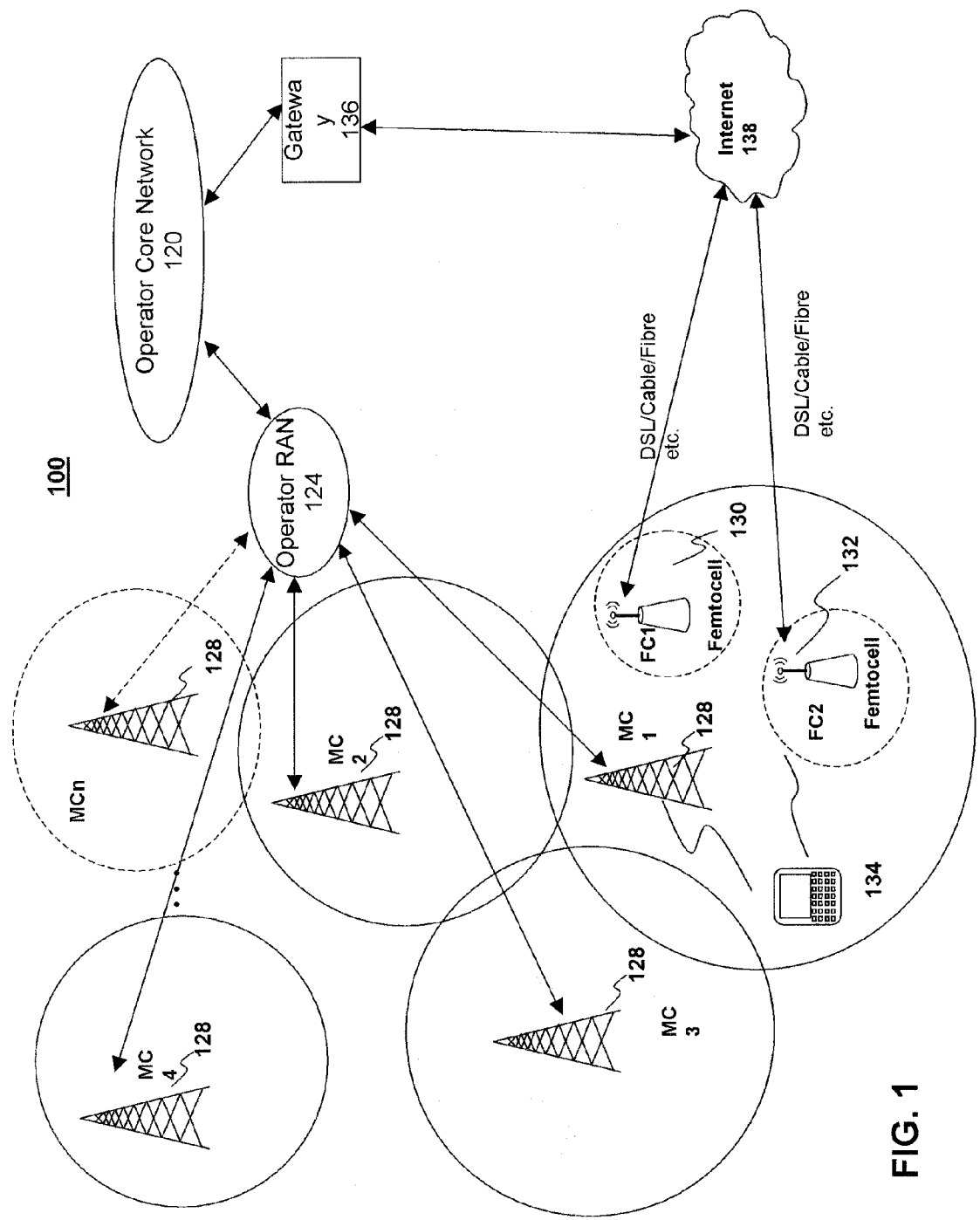
FIG. 1 is a block diagram generally illustrating the architecture of an exemplary wireless network.

The present disclosure provides a system and method for detecting home cells in a cellular network, and more particularly describes an efficient method for scanning for home cells where the scanning involves adaptive searching for a home cell controlled by information indicating the relative proximity of a mobile device to the home cell. Scanning or searching for available networks is an example of how the mobile device might determine available networks.

A benefit of the present system and method may be reduced battery consumption by the mobile device.

Since a typical home cell may not broadcast any indication identifying it as a femtocell or a mobile device may not be able to decode such indication, mobile devices may employ a home cell reselection algorithm to infer the identity of their home cell. At the same time macro cells, overlapping with tens of home cells, either do not have capability of broadcasting all the present neighboring cells in a neighbor cell list (i.e. femto cells as home cells) or do not have a cross-RAT protocol to inform the mobile device regarding the home cell presence (e.g. WiFi access points acting as home cells), making it difficult for mobile devices to find their own home cells in an efficient manner. Therefore wireless mobile devices end up spending a considerable amount of time and battery power scanning for their home cells.

Accordingly, the present matter provides a system and method for mobile devices to derive information indicating whether it is approaching or leaving a subscribed home cell and then use this information to tune or optimize its home cell scanning. As will be appreciated the present system and method is particularly applicable to situations where the target cell is considered as "home", however the system and method can be applied to detecting any cell (including macro cells).

Accordingly the present matter provides a method for detecting a target cell by a mobile device, the method comprising storing one or more traversed paths of the mobile device, the stored traversed paths each comprising information to identify cells in a sequence of cells traversed by the mobile device referenced to the target cell; determining a current path based on information identifying cells traversed by the device; and determining a relative proximity of the mobile device to the target cell based on the current path and the stored traversed paths.

The method further provides for using the relative proximity for configuring a search for the target cell.

The configuring including increasing, decreasing; stopping or starting the search for the target cell or a combination of such actions.

The target cell is preferably a femto cell or WiFi cell that the user has subscription with and the traversed cells are typically macro cells but not limited to macro cells.

Further there is provided a mobile device for detecting a target cell comprising a target cell detection module configured for: storing to a memory traversed paths of the mobile device, the stored traversed paths each comprising information to identify cells in a sequence of cells traversed by the mobile device referenced to the target cell; compiling information identifying cells traversed by the mobile device in real-time to produce current path information comparing the current path information to the stored traversed paths; and inferring from the comparison a relative proximity of the mobile device to the target cell.

There is further provided that the lists of cells include entries that enumerate network identifications (Ids), and that the tracking of the current path and comparison to registered (stored) paths occur following the departure from the home cell coverage area (e.g. handover or cell reselection from home cell in the case of the same RAT, or coverage loss of home cell in the case of different RAT's).

There is further provided that the storing a particular path occurs subsequent to entering coverage of the home cell. It may be noted that the present embodiments are applicable to cross-RAT transfers (transfers between home cells and macro cells of different RAT's) as well as common RAT transfers (transfers between home cells and macro cells of the same RAT).

In a still further embodiment there is provided a method for managing power in a mobile device, the method comprising obtaining information about cells traversed by the mobile device referenced to a target cell; inferring from a current cell and the cells traversed, a relative proximity of the mobile device to the target cell; and using the relative proximity for configuring a search for the target cell.

The present matter is described in a non-limiting, example context of an architecture for an operator wireless network system 100 shown in FIG. 1. The operator wireless network 100 includes operator radio access network (RAN) 124 serving macro cells (MCs) MC1-MC4 . . . MCn and connects to operator core network 120. Connected to the operator core network 120 are femtocells FC1 130 and FC2 132 (as examples of home cells) having their own RAN and some components in common with the core network 120. Each femtocell connects to the operator core network 120 via Gateway 136 using the Internet protocol (over DSL, cable etc.). The femtocells FC1 and FC2 are geographically overlaid or overlapped by the macro cell MC1. Circles in the drawings show the RF coverage of the cells schematically. In this description the femtocells are described as a specific example of a home cell implementation.

A user equipment unit (UE), such as user equipment unit (UE) 134 communicates with one or more cells or 128, 130, 132 over one or multiple air interfaces. The user equipment unit 134 is preferably a two-way communication device having data and/or voice communication capabilities and can be a mobile station or device such as a mobile telephone ("cellular" telephone) and laptop with mobile termination, and thus can be, for example, portable, pocket, hand-held, computer-included, or car-mounted mobile device, which communicate voice and/or data with radio access network. The terms mobile station and mobile device are used synonymously herein.

The RAN 124 shown in FIG. 1 can be, by way of non-limiting example, a UMTS Terrestrial Radio Access Network (UTRAN). Other types of telecommunications systems which encompass other types of radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) systems such as cdmaOne/cdma200, and Long Term Evolution (LTE).

The RAN 124 is connected to core network 120 over an interface, such as an Iu interface for UTRAN. The core network 120 in case of a UMTS network can comprise, among other things a Mobile Switching Center (MSC) node, a Gateway MSC node (GMSC), a Gateway General Packet Radio Service (GPRS) support node (GGSN), and a General Packet Radio Service (GPRS) Service (SGSN) node. Circuit switched (CS) network or packet switched (PS) network can be connected to core network 120.

As mentioned above, the femto radio base stations 132 and 130 are generally connected to the femto gateway 136 via an extended connection formed by an Internet protocol (IP) connection over an IP network 138. The femto gateway 136 is connected to the core network 120.

Figure 2:
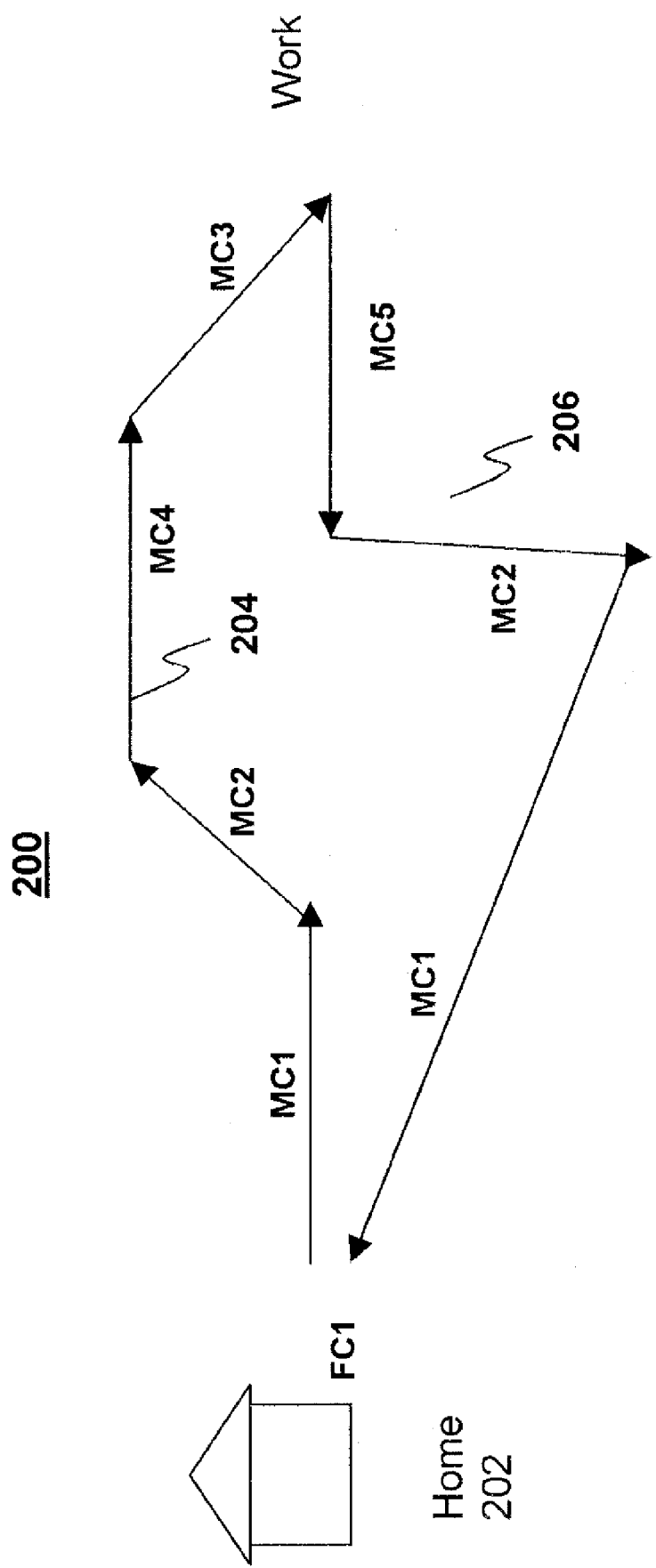
FIG. 2 is a schematic diagram of exemplary cell tracks.

Referring now to FIG. 2 there is shown, schematically, a path 200 of a mobile device as it transverses radio network cells. In the example illustrated, the path may be the route a user follows from home to work and back. If it is assumed that the user starts off in a target cell, usually a home cell located in his/her home 202, for example FC1, shown in FIG. 1, and then progresses along a route that takes the user through macro cells MC1, MC2, MC4 and MC3 to work, then this may be designated a first track 204. Similarly a second track 206 may be when the user returns home. The second track 206 may progress along a different route that takes the user through macro cells MC5, MC2, MC1 and eventually to the home cell FC1. If the user repeats this behavior for days at a time then the present method may extract information from this repetitive behavior of the device (i.e. the device being taken to work and returning home every weekday) to improve searching for the users home cell.

The use of the information derived from this repetitive behavior may be explained as follows. Assuming that a user has installed a home cell the improved behavior expected from his/her wireless mobile device would be to reselect to this home cell as soon as the device enters RF coverage of the owner's home cell. If the mobile device can predict that the user is on his/her way or getting close to the location of home cell then it can use this information to tune its home network reselection algorithm—e.g. by triggering more frequent searching for the home network.

Furthermore, wireless devices can utilize information from either the same type of network if the home cell and the cellular network share the same RAT type or cross-network if the home cell and the cellular network are in different RATs types to build a knowledge base for use in determining whether the device is approaching or leaving the target home cell.

A cellular network broadcasts its identifiers over a broadcast channel. Examples of such identifiers are Cell Global Identifier, Routing Area Code, Location Area Code, Utran Routing Area Code in a UMTS network; System Id, Network Id, Base Id in a cdma2000 1xnetwork; Subnet, Colour Code, and Sector Id in a cdma2000 1xEV-DO network; tracking area code in a LTE network. In addition, there are physical attributes associated with a cellular network such as radio access technology and frequency. For the target home cell, the device can store the cellular network trace information preceding successful home cell acquisition. For instance, on the way home, a user may pass through macro network cells (e.g. GSM/GPRS/EDGE cells or CDMA 1x/1xEV-DO cells) MC5, MC2 and MC1 and when she/he arrives home a successful system acquisition to home cell FC1 is performed. The device may store this track information (i.e. identifiers of cells of different access types) of n cells, where n is the number of cells (n=3 in the example illustrated in FIG. 2) and associate it to the target home cell. Therefore if on another day the user returns home using the same route, by monitoring identifiers associated with cells that the device is traversing in real time (current path) and comparing it to the lists (stored paths) associated to the target home cell, the device may infer that the user is on his/her way home and decrease its search interval for the home cell. A certain home cell can have more than one stored path (as user may proceed along different paths to their home) and the lists may be of different length. For instance, the home cell FC1 can have Path-1: MC3, MC4, MC2, and MC1; Path-2: MC5, MC2, and MC1 as valid stored paths ending at the home cell FC1. In this case home cell FC1 has two stored paths (i.e. m=2) and each path is made up of four and three cells respectively (i.e. n=4 and n=3).

The information may be utilized in a reverse manner. As the user leaves the location of the home cell the device detects that and either reduces searching or completely stops searching for the home cell.

The mobile device can also use information of other neighboring home cells—e.g. each unit in an apartment building may have its own home cell installed. As the user exits an elevator to their apartment, the device may detect a series of femto cells (which may appear to have a stronger signal strength than the cellular network). The mobile device may use a combination of cellular cells and "other" home cells that surround subscriber's own home cell to identify his/her home cell. Accordingly, the stored path may include macro cells and other home cells.

Figure 3:
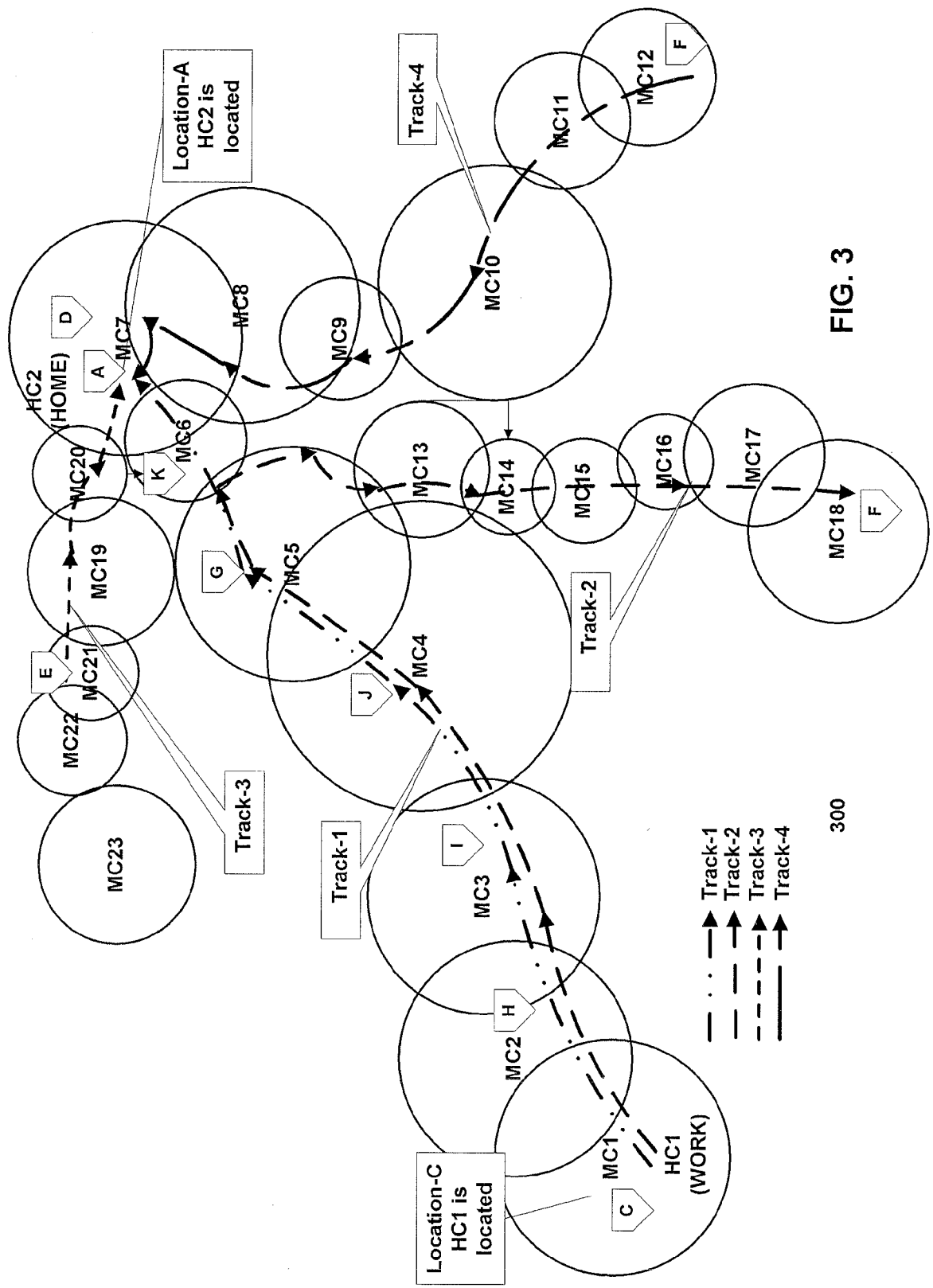
FIG. 3 is a schematic diagram of further exemplary cell track routes.

Referring now to FIG. 3 there is shown further example paths 300 for illustrating configuring frequency scanning or target cell searching according to embodiments of the present matter. In this example it is assumed that there are two home cells (HCs) in the communication environment, HC1 and HC2. Further consider that the home cells and the macro cells operate on different radio access networks. Namely, macro cells belong to WCDMA/UMTS networks and home cells belong to WLAN/IEEE 802.11 technology. Consider first home cell HC2. For this home-cell, the chosen track length is 5 (n=5) and the number of the stored paths is 3 (m=3), in other words consider that there are three stored paths associated with it which may be used to assist in searching for the home cell. Namely:

Stored Path-1: This path is on Track-1 and made up off MC3, MC4, MC5, MC6, MC7

Stored Path-2: This path is on Track-4 and made up off MC11, MC10, MC9, MC8, MC7

Stored Path-3: This path is on Track-3 and made up off MC22, MC21, MC19, MC20, MC7

Figure 4A:
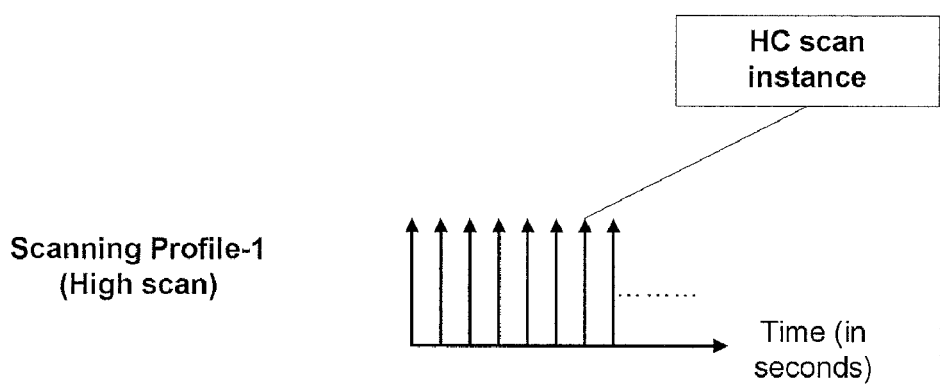
FIGS. 4a-4c shows schematic diagrams of exemplary scanning profiles.
Figure 4B:
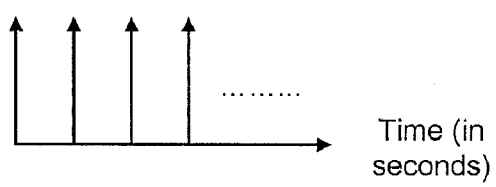
Figure 4C:
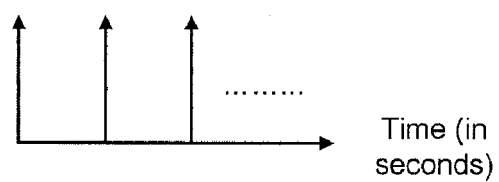

In a further embodiment each stored path may have a reliability measure associated with it. This reliability may be used to choose an appropriate scanning profile for that home cell as illustrated below. Referring to FIGS. 4a, 4b and 4c there is shown an example of respective scanning profiles. The scanning profiles show a home cell scan instance plotted against time i.e. there is shown a scan rate for the device when in proximity to a home cell. For example, FIG. 4a shows a high scan rate, FIG. 4b shows a medium scan rate and FIG. 4c shows a low scan rate. The following example illustrates how a device may determine which scanning profile to use. For instance, consider the device traversing Path-1 1000 times, if for 950 traversals, it successfully found and reselected the home cell HC2 (WiFi cell in this case). A reliability measure of 950/1000 or 95% may be associated with this stored path. Then the device may consider this stored path very reliable and associate with this stored path a relatively high scanning frequency when the device is at the end of the stored path i.e. scanning profile profile-1, as illustrated in FIG. 4a. In other words if the device detects that the user is on this stored path, then since it has a high reliability measure, a higher scanning rate can be used. The reliability measure is dynamically updated and maintained as the device traverses a given path.

In a still further embodiment a decision as to which scanning profile to choose may also be based on whether a search is successful or not. For example, this may be implemented by referring to a timer setting. For instance, after traversing stored path-1, if the device could not find the associated home cell within a duration t1 set by a timer, and then the device may consider this search as failed and abort high scan rate as specified in scanning profile-1. For instance, as illustrated in FIG. 3 if at the end of track-1 the user goes to a location-D instead of location-A where the home cell HC2 is located, the search for the home cell HC2 at the end of the path will fail. The scan will not be initiated before the last cell (i.e. MC7 in this case) is observed by the device. For instance, for stored path-1, there is no point in triggering the home cell scan when the user traversed the cells MC3, MC4 and user is in MC5 currently. However different scanning profiles can be assigned for traversing through whole cells of stored Path-1 and traversing only the last two cells (MC6 and MC7) of the considered path. Because, traversing all five cells of the path presents more reliability in terms of repetitive behavior than traversing only the last two.

Figure 5:
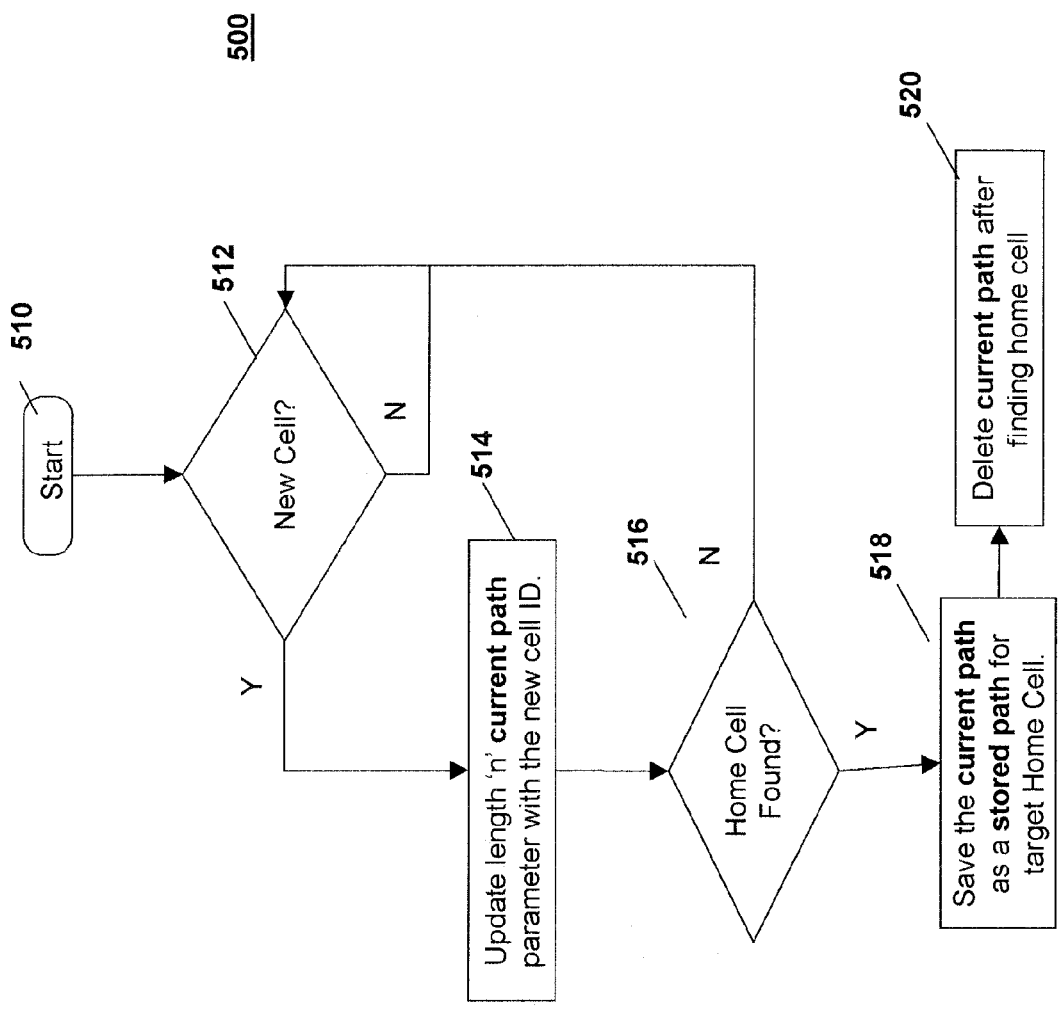
FIG. 5 is a flow chart of an exemplary method for creating current path and stored paths by traversing network cells.

Referring to FIG. 5 there is shown a flow chart 500 of a method for creating a temporary current path as well as stored path in a mobile device for use in detecting a home cell, according to an embodiment of the present matter. In this case it is assumed that the mobile device keeps track of the last n cells (current path) prior to a detection of its home cell. At step 510 the process begins, such as when a radio or power-on occurs. At step 512 the device determines whether it is in a new cell due to initial cell selection or mobility or not. If a new cell is detected, then at step 514 the relevant cell information is used to update a current path parameter in the mobile device. At step 516 the device checks if the new cell is the targeted home cell or not. If not, the device continues to update current path information with the identifiers associated with cells that are traversed. Once the home cell is detected or a hand-over or reselection to the home cell has occurred, at step 518 the device saves the current path that consists of the last n cells traversed into a stored path for the target home cell. The current path may be deleted 520 after finding the home cell. As will be appreciated a new stored path may be created or an existing stored path may be updated. It will also be appreciated that the device may be optioned to create any number of stored paths. For example the device may be optioned to create a stored path from the last n cells traversed every time the device detects the presence of its home cell. Alternatively the device may create a stored path of the n cells following a coverage loss of the subscribed home cell. As will be further appreciated the stored path, as exemplified herein, may be stored as an ordered list, wherein the order specifies a sequence of cells traversed in a direction followed by the device relative to the target home cell i.e. approaching the home cell or retreating from the home cell. However other techniques for identifying direction from the list of stored cells may be employed.

Figure 6:
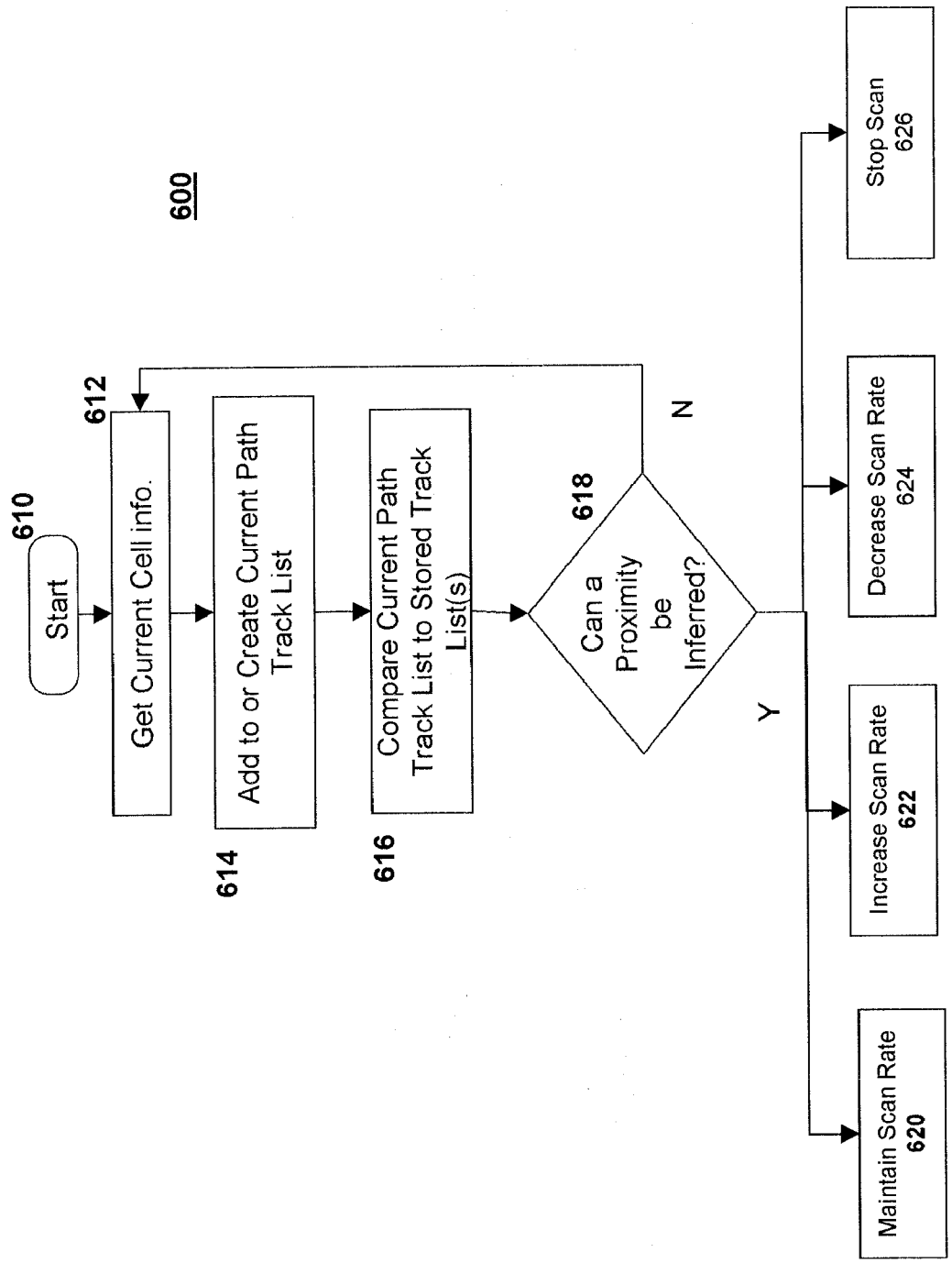
FIG. 6 is a flow chart of an exemplary method for detecting a home cell.

Referring now to FIG. 6 there is shown a flow chart 600 of a method for detecting a home cell according to an embodiment of the present matter. The process begins at step 610 and at step 612 the device obtains its current cell identification. At step 614 the current cell information is added to a current path track list. At step 616 the current path track list is compared to the stored track lists created as described with reference to FIG. 5. At step 618 proximity of the device to the home cell is determined by matching the current path to one of the stored track lists. If proximity cannot be inferred, i.e. by the current path not matching any stored path, the method 600 returns to step 612 to continue compiling current path information.

For example referring to FIG. 7 there is shown graphically 700 the process of matching in real-time. There is shown in FIG. 7 three columns, namely a location 702 (referring to location information in FIG. 3), status of the device's current path parameter 704 and the results of the current path comparison to a stored path-1 706. In the example, the comparison at step 616 (shown in FIG. 6) may indicate that the device is approaching the home cell, for example the last n traversed cells correspond, in order, to the n cells in a stored path, in which case proximity can be inferred i.e. the mobile device is in an RF region within which the mobile device may begin to communicate with the home cell. Based on the proximity determination, the rate of searching for the target home cell may be increased, step 622. Alternatively it may be found that there has been no change in proximity information for certain duration or it could be the case that even though the device traced through the considered stored path where normally home cell located but could not detect the home cell for an considerable amount of time. In this case, device may reduce the rate 624 of searching for more preferred network or cell. If the proximity decision indicates that the device is moving away from the home cell then searching frequency for home network may be decreased 624 or maintained the same 620, following which the scan rate may be stopped 626 if the proximity does not change, or for example it is found that the device is on a stored path but sufficiently distant from the home cell, then the device may decide not to scan at all.

In addition to the above, current location information (such as from a devices GPS circuitry) of the mobile device may be used in conjunction with the stored path information to infer the position of the mobile device relative to a home cell.

Thus it may be seen from the above, that by comparing the current path with already known stored paths, the mobile device may infer a proximity to its home cell and adjust the rate of searching for the home network in an optimal manner. This enables the searching for the home network to be turned off or reduced in order to save battery power.

Figure 8:
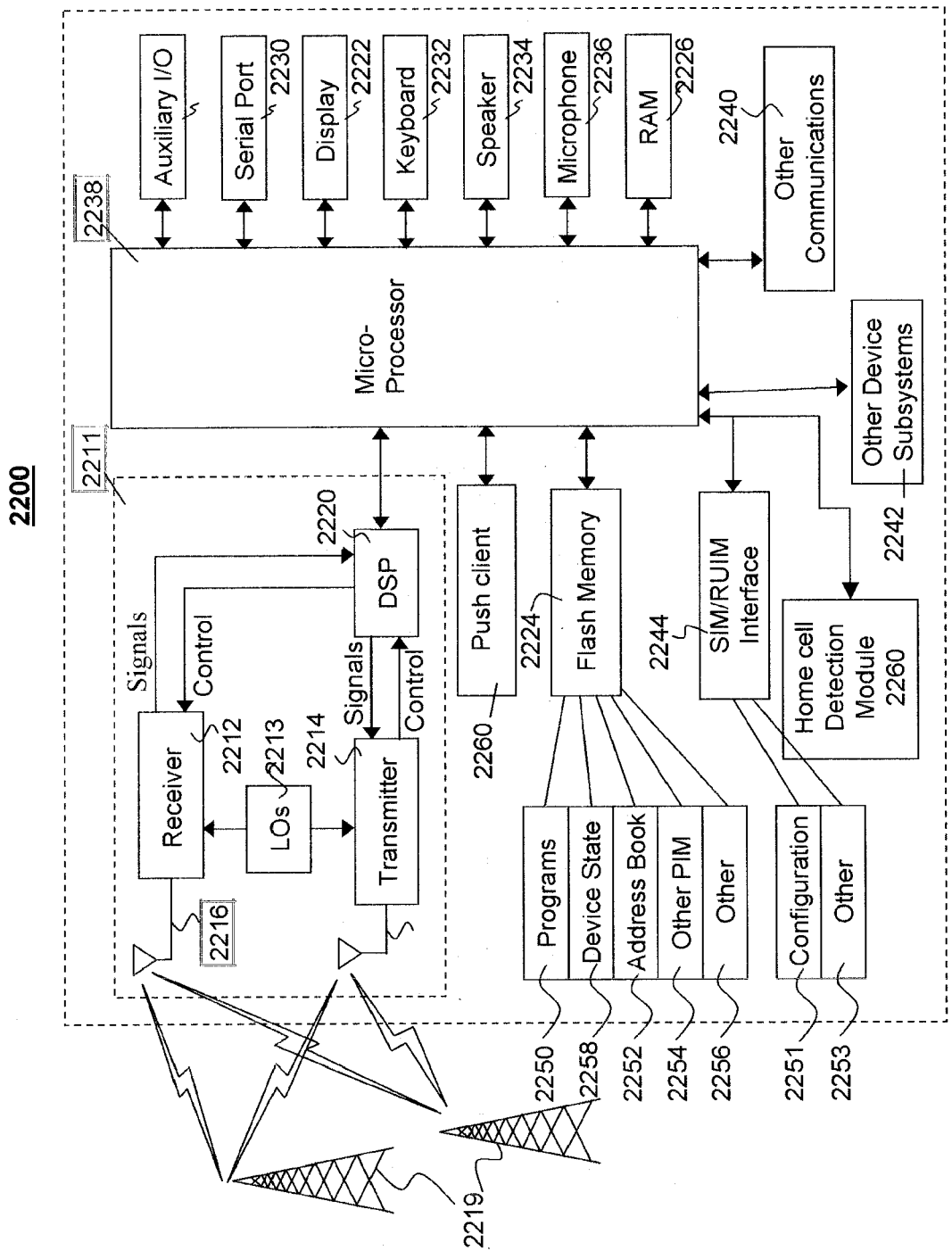
FIG. 8 is a block diagram of an exemplary mobile device that can be used in association with the present method and apparatus.

While various mobile devices could be used to implement the above-captioned method and apparatus, an exemplary mobile device is illustrated in FIG. 8. The mobile device of FIG. 8 is not meant to be limiting, but merely provides an example of a mobile device that could be used in association with the present method and apparatus.

FIG. 8 is a block diagram illustrating a mobile device apt to be used with preferred embodiments of the apparatus and method of the present application. Mobile device 2200 is preferably a two-way wireless communication device having at least voice and data communication capabilities. Mobile device 2200 preferably has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, or a data communication device, as examples.

Where mobile device 2200 is enabled for two-way communication, it will incorporate a communication subsystem 2211, including both a receiver 2212 and a transmitter 2214, as well as associated components such as one or more, preferably embedded or internal, antenna elements 2216 and 2218, local oscillators (LOs) 2213, and a processing module such as a digital signal processor (DSP) 2220. As will be apparent to those skilled in the field of communications, the particular design of the communication subsystem 2211 will be dependent upon the communication network in which the device is intended to operate.

Network access requirements will also vary depending upon the type of network 2219. A GSM/UMTS device typically has a subscriber identity module (SIM) in order to get full service from the network. A cdma2000 device typically has such access credentials stored in it non-volatile memory or may use a removable user identity module (RUIM) in order to operate on a CDMA network. The SIM/RUIM interface 2244 is normally similar to a card-slot into which a SIM/RUIM card can be inserted and ejected like a diskette or PCMCIA card. The SIM/RUIM card can have approximately 64K of memory and hold many key configurations 2251, and other information 2253 such as identification, and subscriber related information.

When required network registration or activation procedures have been completed, mobile device 2200 may send and receive communication signals over the network 2219. As illustrated in FIG. 8, network 2219 can consist of multiple base stations communicating with the mobile device.

Signals received by antenna 2216 through communication network 2219 are input to receiver 2212, which may perform such common receiver functions as signal amplification, frequency down conversion, filtering, channel selection and the like, and in the example system shown in FIG. 8, analog to digital (ND) conversion. ND conversion of a received signal allows more complex communication functions such as demodulation and decoding to be performed in the DSP 2220. In a similar manner, signals to be transmitted are processed, including modulation and encoding for example, by the DSP 2220 and input to transmitter 2214 for digital to analog conversion, frequency up conversion, filtering, amplification and transmission over the communication network 2219 via antenna 2218. The DSP 2220 not only processes communication signals, but also provides for receiver and transmitter control. For example, the gains applied to communication signals in receiver 2212 and transmitter 2214 may be adaptively controlled through automatic gain control algorithms implemented in the DSP 2220.

Mobile device 2200 preferably includes a microprocessor 2238 which controls the overall operation of the device. Communication functions, including at least data and voice communications, are performed through communication subsystem 2211. Microprocessor 2238 also interacts with further device subsystems such as the display 2222, flash memory 2224, random access memory (RAM) 2226, auxiliary input/output (I/O) subsystems 2228, serial port 2230, two or more keyboards or keypads 2232, speaker 2234, microphone 2236, other communication subsystem 2240 such as a short-range communications subsystem and any other device subsystems generally designated as 2242. Serial port 2230 could include a USB port or other port known to those in the art.

Some of the subsystems shown in FIG. 8 perform communication-related functions, whereas other subsystems may provide "resident" or on-device functions. Notably, some subsystems, such as keyboard 2232 and display 2222, for example, may be used for both communication-related functions, such as entering a text message for transmission over a communication network, and device-resident functions such as a calculator or task list.

Operating system software used by the microprocessor 2238 is preferably stored in a persistent store such as flash memory 2224, which may instead be a read-only memory (ROM) or similar storage element (not shown). Those skilled in the art will appreciate that the operating system, specific device applications, or parts thereof, may be temporarily loaded into a volatile memory such as RAM 2226. Received communication signals may also be stored in RAM 2226.

As shown, flash memory 2224 can be segregated into different areas for both computer programs 2258 and program data storage 2250, 2252, 2254 and 2256. These different storage types indicate that each program can allocate a portion of flash memory 2224 for their own data storage requirements. Microprocessor 2238, in addition to its operating system functions, preferably enables execution of software applications on the mobile device. A predetermined set of applications that control basic operations, including at least data and voice communication applications for example, will normally be installed on mobile device 2200 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 2219. In a preferred embodiment, the PIM data items are seamlessly integrated, synchronized and updated, via the wireless network 2219, with the mobile device user's corresponding data items stored or associated with a host computer system. Further applications may also be loaded onto the mobile device 2200 through the network 2219, an auxiliary I/O subsystem 2228, serial port 2230, short-range communications subsystem 2240 or any other suitable subsystem 2242, and installed by a user in the RAM 2226 or preferably a non-volatile store (not shown) for execution by the microprocessor 2238. Such flexibility in application installation increases the functionality of the device and may provide enhanced on-device functions, communication-related functions, or both. For example, secure communication applications may enable electronic commerce functions and other such financial transactions to be performed using the mobile device 2200.

In a data communication mode, a received signal such as a text message or web page download will be processed by the communication subsystem 2211 and input to the microprocessor 2238, which preferably further processes the received signal for output to the display 2222, or alternatively to an auxiliary I/O device 2228.

A user of mobile device 2200 may also compose data items such as email messages for example, using the keyboard 2232, which is preferably a complete alphanumeric keyboard or telephone-type keypad, in conjunction with the display 2222 and possibly an auxiliary I/O device 2228. Such composed items may then be transmitted over a communication network through the communication subsystem 2211.

For voice communications, overall operation of mobile device 2200 is similar, except that received signals would preferably be output to a speaker 2234 and signals for transmission would be generated by a microphone 2236. Alternative voice or audio I/O subsystems, such as a voice message recording subsystem, may also be implemented on mobile device 2200. Although voice or audio signal output is preferably accomplished primarily through the speaker 2234, display 2222 may also be used to provide an indication of the identity of a calling party, the duration of a voice call, or other voice call related information for example.

Serial port 2230 in FIG. 8 would normally be implemented in a personal digital assistant (PDA)-type mobile device for which synchronization with a user's desktop computer (not shown) may be desirable, but is an optional device component. Such a port 2230 would enable a user to set preferences through an external device or software application and would extend the capabilities of mobile device 2200 by providing for information or software downloads to mobile device 2200 other than through a wireless communication network. The alternate download path may for example be used to load an encryption key onto the device through a direct and thus reliable and trusted connection to thereby enable secure device communication. As will be appreciated by those skilled in the art, serial port 2230 can further be used to connect the mobile device to a computer to act as a modem.

The Mobile device 2200 has a target cell detection module 2260 which interacts with select components of the device described above to store to the device memory, traversed paths of the mobile device, the stored traversed paths each comprising the list of cells traversed by the mobile device along a route referenced to a target home cell. Information about the traversed cells is obtained via the communication subsystem 2211. Further the module implements the functions of detecting cells currently traversed by the mobile device to form a current path, comparing the current path to the stored traversed paths obtained from memory; and inferring from the comparison a relative proximity of the mobile device to the target cell. The module 2260 may then instruct the devices scanning or searching function in response to the proximity determination to optimize the scanning or searching in a manner as described herein.

Other communications subsystems 2240, such as a short-range communications subsystem, is a further optional component which may provide for communication between mobile device 2200 and different systems or devices, which need not necessarily be similar devices. For example, the subsystem 2240 may include an infrared device and associated circuits and components or a Bluetooth™ communication module to provide for communication with similarly enabled systems and devices.

Thus it may be seen that the present disclosure provides an efficient method for scanning for target cells such as home cells or even macro cells.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for detecting a target cell by a mobile device, the method comprising:
   a. receiving cell identifications over a broadcast channel, identification of the target cell being indistinguishable to the mobile device using the received cell identifications;
   b. storing one or more traversed paths of the mobile device, the stored traversed paths each comprising information to identify cells in a sequence of cells traversed by the mobile device referenced to the target cell;
   c. determining a current path based on information identifying cells traversed by the device;
   d. determining a relative proximity of the mobile device to the target cell based on the current path and the stored traversed paths; and
   e. adapting a search interval in a scan for the target cell based on the relative proximity.

2. The method of claim 1, wherein said received cell identification includes identification of the target cell and said mobile device is unable to decode the received identification of the target cell to distinguish the target cell.

3. The method of claim 1, wherein said determining relative proximity including comparing the current path to the stored traversed paths.

4. The method of claim 1, wherein the adapting including one of increasing, decreasing, stopping or starting the search for said target cell.

5. The method of claim 1, wherein the relative proximity indicating a direction of travel of the device relative to the target cell.

6. The method of claim 1, wherein the target cell is a femto cell or WiFi cell and the traversed cells are macro cells.

7. The method of claim 1, wherein the target cell is a home cell of the mobile device.

8. The method of claim 1, wherein the traversed cells include macro cells and femto cells.

9. The method of claim 1, wherein the information to identify cells includes network cell identifiers.

10. The method of claim 1, said storing occurring following a coverage loss of said target cell.

11. The method of claim 1, said storing occurring before detection of the said target cell.

12. The method of claim 1, wherein said received cell identification includes identification of the target cell and said mobile device is unable to decode the received identification of the target cell to distinguish the target cell.

13. The method of claim 1, wherein said received cell identification excludes the identification of the target cell.

14. The method of claim 1, wherein information to identify the target cell is not broadcast in the cells traversed.

15. A mobile device for detecting a target cell comprising:
   a target cell detection module configured for:
   a. receiving cell identification over a broadcast channel identification of the target cell being indistinguishable to the mobile device using the received cell identifications:
   b. storing one or more traversed paths of the mobile device, the stored traversed paths each comprising information to identify cells in a sequence of cells traversed by the mobile device referenced to the target cell;
   c. determining a current path based on information identifying cells traversed by the device;
   d. determining a relative proximity of the mobile device to the target cell based on the current path and the stored traversed paths and
   e. adapting a search interval n a scan for the target cell based on the relative proximity.

16. The mobile device of claim 15, wherein the relative proximity is used for configuring a search for the target cell.

17. The mobile device of claim 16, the configuring including one of increasing, decreasing, stopping or starting the search for the target cell.

18. The mobile device of claim 16, the relative proximity indicating a direction of travel of the device relative to the target cell.

19. The mobile device of claim 15, wherein said received cell identification includes identification of the target cell and said mobile device is unable to decode the received identification of the target cell to distinguish the target cell.

20. The mobile device of claim 15, wherein said received cell identification excludes the identification of the target cell.

21. The mobile device of claim 15, wherein information to identify the target cell is not broadcast in the cells traversed.

22. A method for managing power in a mobile device, the method comprising:
   a. obtaining by the mobile device information about cells traversed by the mobile device referenced to a target cell, identification of the target cell being indistinguishable to the mobile device using the obtained information;
   b. inferring by the mobile device from a current cell and the cells traversed, a relative proximity of the mobile device to the target cell; and
   c. using by the mobile device the relative proximity for configuring a search for the target cell by adapting a search interval in a scan for the target cell based on the relative proximity.

* * * * *